3,082,149
AROMATIC HYDROCARBON EXTRACT OF GAS OIL AS A BIRD REPELLENT
Lyle D. Goodhue, Bartlesville, and Kenneth E. Cantrel, Dewey, Okla., assignors to Phillips Petroleum Company, a corporation of Delaware
No Drawing. Filed Feb. 3, 1959, Ser. No. 790,806
5 Claims. (Cl. 167—46)

This invention relates to the repelling of birds. In one of its aspects, it relates to a method for repelling birds which comprises applying a highly aromatic hydrocarbon extract obtained by the sulfur dioxide extraction of a gas oil from a catalytic hydrocarbon oil cracking unit to a surface from which birds are to be repelled. In another of its aspects, the invention relates to a novel bird repellent composition comprising as an essential active ingredient a highly aromatic hydrocarbon extract resulting from the sulfur dioxide extraction of a gas oil obtained from a catalytic hydrocarbon oil cracking unit.

A number of repellents for pets such as insects and rodents have been developed and are known in the art. However, very little success has been attained in the search for a material which is repellent to birds. It would be highly desirable to be able to repel birds from certain areas and surfaces. As an example of one application for bird repellents, they could be used to prevent the consumption of grain in the field by birds, this loss at the present time amounting to several million dollars.

It is an object of this invention to provide a method for repelling birds. It is another object of this invention to provide a composition for repelling birds.

Other aspects and objects of the invention are apparent from a study of this disclosure and the appended claims.

According to the present invention, there is provided a method for repelling birds which comprises applying to the locus from which birds are to be repelled a highly aromatic hydrocarbon extract obtained by sulfur dioxide extraction of a gas oil obtained from a catalytic hydrocarbon oil cracking unit.

The gas oils which are extracted to obtain the active ingredient of the method and/or composition of this invention are sometimes termed "cycle oils" since these oils are gas oils which, in the ordinary cracking of hydrocarbon oils, are recycled for further cracking. These are oils which are obtained as distillates in the factionation of a cracked oil effluent. As will be understood by one skilled in the art in possession of this disclosure, the gas oil which can be extracted to obtain the active ingredient of the method or composition of this invention can result from cracking in the presence of various catalysts and can be obtained with the use of solvents which are substantially or essentially equivalent with respect to their aromatic fraction extraction properties to sulfur dioxide. Thus, the invention is not to be limited to the extraction with sulfur dioxide as the solvent.

Also according to this invention, the highly aromatic oil which is obtained and used in the method of this invention can be composited with solids and/or liquids to provide novel bird repellent compositions. Solids can comprise soil, sand, clays, and, generally, various adsorptive solids, preferably in sub-divided form. Liquids which can be used are water, preferably with an emulsifying agent, acetone and lower boiling hydrocarbons.

The highly aromatic hydrocarbon extracts which can be employed to repel birds according to the process of this invention are characterized by their relatively high boiling point and their high aromaticity. These hydrocarbon mixtures generally boil between about 400 and about 800° F. and have a Bureau of Mines Correlation Index above 80. The Bureau of Mines Correlation Index is used to denote the aromaticity of an oil, a higher numerical index denoting the more aromatic oil. This index is calculated from the formula $$C.I. = \frac{48640}{K} + 473.7G - 456.8$$

where C.I. equals Bureau of Mines Correlation Index, K equals average boiling point (°K.) of the oil and G equals specific gravity at 60° F./60° F.

The $SO_2$ extract oil can be applied to surfaces from which it is desired to repel birds without dilution, or this oil can be dissolved in a solvent such a lower boiling hydrocarbon, acetone and the like or applied as a dispersion or suspension in water, which evaporates after application. The material can be applied without dilution.

The bird repellent of this invention can be applied by spraying, brushing, and the like. However the material is applied, the application usually is carried out in such a manner so as to deposit an amount within the range of between 1 and 100 grams of the active material per each 100 square feet of surface from which birds are to be repelled. Larger or smaller amounts can be appapplied if desired, although larger amounts are generally uneconomical.

It is not known by what method the $SO_2$ extract oil serves to repel birds. However, it can be seen from the following examples that this material is an effective bird repellent. We do not wish to be limited to the amounts or methods of application shown in these examples, nor is it contemplated that the invention should be limited to the species of birds which were repelled in the actual runs of these examples.

EXAMPLE I

A run was made in which a highly aromatic, $SO_2$ extract oil was tested as a repellent for baby chickens. This aromatic oil had the following typical properties:

*Typical Properties*

ASTM distillation:

| | |
|---|---|
| 5% | ° F.__ 502 |
| 10% | ° F.__ 528 |
| 20% | ° F.__ 562 |
| 30% | ° F.__ 583 |
| 40% | ° F.__ 599 |
| 50% | ° F.__ 615 |
| 60% | ° F.__ 634 |
| 70% | ° F.__ 657 |
| 80% | ° F.__ 689 |
| 90% | ° F.__ 743 |
| 95% | ° F.__ 794 |

| | |
|---|---|
| Gravity, API | 10.9 |
| Bureau of Mines Correlation Index | 95.4 |
| Pour point, ° F. | −5 |
| Aniline point, ° F. | 49.8 |
| Carbon residue | 0.84 |
| Sulfur, weight percent | 1.08 |
| Nitrogen, weight percent | 0.09 |

One gram of this aromatic oil was dissolved in 20 ccs. of acetone, and the solution was applied to 50 grams of chicken feed. The chicken feed was thoroughly mixed with this solution, after which the acetone was evaporated from the feed. The feed was then placed in a cage with two hungry baby chickens, and the grams of chicken feed remaining at the end of three days was determined. Untreated feed was completely consumed before the end of this time. At the end of three days, 43 grams of this treated feed had been consumed.

EXAMPLE II

The SO$_2$ extract oil of Example I was painted (pure material) onto the roof beams of a building frequented by sparrows. After 129 days, the sparrows would still not roost on these beams. Untreated areas of the same beams were roosted on continually by these sparrows.

EXAMPLE III

Eleven fractions obtained by fractionally distilling an SO$_2$ extract oil were tested for repellency toward Coturnix quail by the following procedure. In each run, one gram of the fraction to be tested was dissolved in 40 ccs. of acetone and the solution was applied to 100 grams of chicken feed. The solvent was then evaporated, and the feed was then placed in a cage containing four Coturnix quail. The amount of feed gone at the end of three days was then determined by weighing. If the material is non-repellent, or if the feed is untreated, the quail will eat all of the feed on the first day. The results of these runs are expressed below in the form of a table.

TABLE

| Fraction | Boiling range, °F. | | Grams Feed Gone After Three Days |
|---|---|---|---|
| | Initial Boiling Point | End Point | |
| 1 | 351 | 437 | 100 |
| 2 | (¹) | (¹) | 63 |
| 3 | 470 | 494 | 43 |
| 4 | (¹) | (¹) | 44 |
| 5 | 504 | 531 | 35 |
| 6 | (¹) | (¹) | 28 |
| 7 | 527 | 557 | 55 |
| 8 | (¹) | (¹) | 65 |
| 9 | 557 | 585 | 71 |
| 10 | (¹) | (¹) | 27 |
| 11 | 573 | 590 | 35 |

¹ The boiling ranges of the even-numbered fractions were not determined.

The extraction of gas oil from a unit in which a hydrocarbon oil is cracked in the presence of a catalyst is well known in the oil refining art. A patent which deals with the SO$_2$ extraction of a cycle oil in such a unit is 2,764,522, G. R. Hettick, September 25, 1956. A patent which shows the obtaining of a cycle oil in a catalytic cracking process and its subsequent extraction to obtain an aromatic concentrate is 2,794,710, S. D. Lawson, June 4, 1957.

Reasonable variation and modification are possible within the scope of the foregoing disclosure and the appended claims to the invention, the essence of which is that it has been found that a highly aromatic hydrocarbon fraction obtained upon solvent extraction of a gas oil obtained upon the catalytic cracking of hydrocarbon oil is repellent to birds.

We claim:

1. A method of repelling a bird which comprises subjecting said bird to the action of a highly aromatic hydrocarbon extract fraction repellent to birds obtained upon solvent extraction of a gas oil, the solvent used for this extraction being one which preferentially dissolves said highly aromatic fraction, obtained from a catalytic hydrocarbon oil cracking operation wherein cycle oils are formed and solvent extracted to obtain said fraction, said fraction being further characterized by consisting of a mixture of hydrocarbons boiling between about 400 and about 800° F. and having a Bureau of Mines Correlation Index above 80.

2. A method of protecting a building against roosting thereon of birds which comprises applying to said building a highly aromatic hydrocarbon extract fraction repellent to birds obtained upon solvent extraction of a gas oil, the solvent used for this extraction being one which preferentially dissolves said highly aromatic fraction, obtained from a catalytic hydrocarbon oil cracking operation wherein cycle oils are formed and solvent extracted to obtain said fraction, said fraction being further characterized by consisting of a mixture of hydrocarbons boiling between about 400 and about 800° F. and having a Bureau of Mines Correlation Index above 80.

3. A seed protected against ravaging or eating by birds, said seed having been impregnated with a highly aromatic hydrocarbon extract fraction repellent to birds obtained upon solvent extraction of a gas oil, the solvent used for this extraction being one which preferentially dissolves said highly aromatic fraction, obtained from a catalytic hydrocarbon oil cracking operation wherein cycle oils are formed and solvent extracted to obtain said fraction, said fraction being further characterized by consisting of a mixture of hydrocarbons boiling between about 400 and about 800° F. and having a Bureau of Mines Correlation Index above 80.

4. A method of treating seeds to render the same repellent to birds which comprises applying to said seeds a highly aromatic hydrocarbon extract fraction repellent to birds obtained upon solvent extraction of a gas oil, the solvent used for this extraction being one which preferentially dissolves said highly aromatic fraction, obtained from a catalytic hydrocarbon oil cracking operation wherein cycle oils are formed and solvent extracted to obtain said fraction, said fraction being further characterized by consisting of a mixture of hydrocarbons boiling between about 400 and about 800° F. and having a Bureau of Mines Correlation Index above 80.

5. A method of repelling birds from grain in the field which comprises treating said grain with a highly aromatic hydrocarbon extract fraction repellent to birds obtained upon solvent extraction of a gas oil, the solvent used for this extraction being one which preferentially dissolves said highly aromatic fraction, obtained from a catalytic hydrocarbon oil cracking operation wherein cycle oils are formed and solvent extracted to obtain said fraction, said fraction being further characterized by consisting of a mixture of hydrocarbons boiling between about 400 and about 800° F. and having a Bureau of Mines Correlation Index above 80.

References Cited in the file of this patent

UNITED STATES PATENTS

| | | |
|---|---|---|
| 1,347,508 | Harshfield | July 27, 1920 |
| 2,055,491 | Hampton | Sept. 29, 1936 |
| 2,160,929 | Warner et al. | June 6, 1939 |
| 2,347,265 | Hyman | Apr. 25, 1944 |
| 2,429,875 | Good et al. | Oct. 28, 1947 |
| 2,764,522 | Hettick | Sept. 25, 1956 |
| 2,898,263 | Nelson et al. | Aug. 4, 1959 |

OTHER REFERENCES

Smith: J. of Forestry, vol. 45, pp. 361–369.